United States Patent
Reed (10) Patent No.: US 11,417,973 B2
(45) Date of Patent: Aug. 16, 2022

(54) CONNECTOR ASSEMBLY FOR CONNECTION TO A VEHICLE ELECTRICAL GROUND

(71) Applicant: Hopkins Manufacturing Corporation, Emporia, KS (US)

(72) Inventor: Scott Reed, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 94 days.

(21) Appl. No.: 17/088,717

(22) Filed: Nov. 4, 2020

(65) Prior Publication Data

US 2022/0140504 A1 May 5, 2022

(51) Int. Cl.
| | |
|---|---|
| *H01R 11/12* | (2006.01) |
| *H01R 4/30* | (2006.01) |
| *B60R 16/02* | (2006.01) |
| *H01R 4/70* | (2006.01) |
| *H01R 4/34* | (2006.01) |

(52) U.S. Cl.
CPC .......... *H01R 11/12* (2013.01); *B60R 16/0215* (2013.01); *H01R 4/305* (2013.01); *H01R 4/70* (2013.01); *H01R 4/34* (2013.01); *H01R 2201/26* (2013.01)

(58) Field of Classification Search
CPC .. H01R 13/5219; H01R 13/5202; H01R 4/34; H01R 4/305; H01R 4/70; H01R 23/7042; H01R 11/12; B60R 16/0215
USPC ....... 439/278, 271, 801, 573, 556, 559, 564, 439/567
See application file for complete search history.

(56) References Cited

U.S. PATENT DOCUMENTS

| | | | | |
|---|---|---|---|---|
| 4,053,693 | A * | 10/1977 | Munch | F16J 15/062 439/271 |
| 4,231,631 | A * | 11/1980 | Guerinault | H01M 50/529 439/559 |
| 5,895,290 | A * | 4/1999 | Self, Jr. | H01R 13/5208 439/588 |
| 6,344,612 | B1 * | 2/2002 | Kuwahara | H02S 40/34 174/59 |
| 2004/0106323 | A1 * | 6/2004 | Matsushita | H01R 13/629 439/559 |
| 2019/0006788 | A1 * | 1/2019 | Cerfeuillet | H01R 4/5025 |

* cited by examiner

*Primary Examiner* — Gary F Paumen
(74) *Attorney, Agent, or Firm* — Hovey Williams LLP (57) ABSTRACT

A connector assembly for providing electrical connection from an electrical device ground wire to a vehicle chassis ground comprises a wire connector, a cable, and a surface connector. The wire connector is configured to receive the electrical device ground wire. The cable is electrically connected to the ground wire. The surface connector is coupled to the cable and configured to attach to a vehicle chassis. The surface connector includes a conductive disc, an outer insulating ring, and an inner insulating ring. The conductive disc is electrically connected to the cable and includes a central opening configured to receive a fastener which attaches the surface connector to the chassis. The inner insulating ring, a portion of the lower surface of the conductive disc, and the outer insulating ring form a hermetically sealed chamber with the chassis when the surface connector is attached to the chassis.

9 Claims, 5 Drawing Sheets

CONNECTOR ASSEMBLY FOR CONNECTION TO A VEHICLE ELECTRICAL GROUND

FIELD OF THE INVENTION

Embodiments of the current invention relate to electrical connector assemblies that connect to electrical ground on a vehicle.

BACKGROUND

Connector assemblies that connect to a vehicle chassis or electric power distribution enclosures to provide an electrical ground connection typically include a ring connector that connects to a grounding wire and a washer that connects to the chassis or enclosure. Over time, water and road salt, among other materials, come into contact with the connector and oxidize the exposed mating surfaces of the ring connector and washer which increase the impedance of the electrical connection and may lead to loss of operation of any electrical devices connected to the connector assembly.

SUMMARY OF THE INVENTION

Embodiments of the current invention solve the above-mentioned problems and provide a distinct advance in the art of providing an electrical connection from a ground wire to a vehicle's electrical ground or electric ground of an electric power distribution enclosure. Specifically, embodiments of the current invention provide a connector assembly which forms a hermetic seal at the point of contact between the connector assembly and a vehicle chassis or the enclosure. The seal prevents oxidation of the connector assembly and chassis surfaces or enclosure surfaces.

In one embodiment, the connector assembly broadly comprises a wire connector, a cable, and a surface connector. The wire connector is configured to receive the electrical device ground wire. The cable is electrically connected to the ground wire. The surface connector is coupled to the cable and configured to attach to the vehicle chassis. The surface connector includes a conductive disc, an outer insulating ring, and an inner insulating ring. The conductive disc is electrically connected to the cable and includes an upper surface, an opposing lower surface, a circumferential outer edge, and a spaced apart circumferential inner edge defining a central opening configured to receive a fastener which attaches the surface connector to the chassis. The outer insulating ring covers a portion of the upper surface, the outer edge, and a portion of the lower surface of the conductive disc. The inner insulating ring is positioned in contact with the lower surface of the conductive disc and includes an inner edge aligned with the inner edge of the conductive disc. The inner insulating ring, a portion of the lower surface of the conductive disc, and the outer insulating ring form a hermetically sealed chamber with the chassis when the surface connector is attached to the chassis.

In another embodiment, the connector assembly broadly comprises a wire connector, a cable, and a surface connector. The wire connector is configured to receive the electrical device ground wire. The cable is electrically connected to the ground wire. The surface connector is coupled to the cable and configured to attach to the vehicle chassis. The surface connector includes a conductive disc, an outer insulating ring, an inner insulating ring, and a washer. The conductive disc is electrically connected to the cable and includes an upper surface, an opposing lower surface, a circumferential outer edge, and a spaced apart circumferential inner edge defining a central opening configured to receive a fastener which attaches the surface connector to the chassis. The outer insulating ring is formed from elastomeric material and covers a portion of the upper surface, the outer edge, and a portion of the lower surface of the conductive disc. The inner insulating ring is formed from elastomeric material and is positioned in contact with the lower surface of the conductive disc. The inner insulating ring includes an inner edge aligned with the inner edge of the conductive disc. The washer is formed from electrically conductive material and is positioned adjacent to the lower surface of the conductive disc and between the inner insulating ring and the outer insulating ring. The washer provides an electrical connection between the conductive disc and the chassis when the surface connector is attached to the chassis. The inner insulating ring and the outer insulating ring each compress when the surface connector is attached to the chassis. The inner insulating ring, a portion of the lower surface of the conductive disc, and the outer insulating ring form a hermetically sealed chamber with the chassis.

In yet another embodiment, the current invention provides a connector assembly for providing electrical connection from an electrical device ground wire to an electric power distribution enclosure. The connector assembly broadly comprises a wire connector, a cable, and a surface connector. The wire connector is configured to receive the electrical device ground wire. The cable is electrically connected to the ground wire. The surface connector is coupled to the cable and configured to attach to a wall of the electric power distribution enclosure. The surface connector includes a conductive disc, an outer insulating ring, an inner insulating ring, and a washer. The conductive disc is electrically connected to the cable and includes an upper surface, an opposing lower surface, a circumferential outer edge, and a spaced apart circumferential inner edge defining a central opening configured to receive a fastener which attaches the surface connector to the wall. The outer insulating ring covers a portion of the upper surface, the outer edge, and a portion of the lower surface of the conductive disc. The inner insulating ring is positioned in contact with the lower surface of the conductive disc and includes an inner edge aligned with the inner edge of the conductive disc. The inner insulating ring, a portion of the lower surface of the conductive disc, and the outer insulating ring form a hermetically sealed chamber with the wall when the surface connector is attached to the electric power distribution enclosure.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

A connector assembly 10, constructed in accordance with various embodiments of the current invention, is shown in FIG. 1-11. In some embodiments, the connector assembly 10 provides electrical connection from electrically powered devices or components to a vehicle electrical ground. The electrically powered devices may include a trailer pulled by a vehicle or other electrical or electronic components that are utilized with or around a vehicle. Typically, the electrical connection to the vehicle electrical ground is made at one of a plurality of points on a chassis or frame of the vehicle. In other embodiments, the connector assembly 10 may be utilized with electric power distribution enclosures, such as breaker or fuse boxes, junction boxes, control panels, and the like. The enclosures typically include a plurality of connected walls that form a box. And the electrical connection to ground is made on one of the walls of the enclosure. The connector assembly 10 broadly comprises a wire connector 12, a cable 14, and a surface connector 16.

The wire connector 12 generally provides electrical connection to an external wire or cable that electrically connects to electrical ground on the electrical or electronic device that is utilized with or around the vehicle. An exemplary wire connector 12, as shown in FIGS. 1-5, includes a marine grade female hollow tubular structure with a first end and an opposing second end. The wire connector 12 has an electrically conductive inner surface and an electrically insulating outer surface, wherein the electrically conductive surface may be formed from electrically conductive material (i.e., metals or metal alloys), while the electrically insulating surface may be formed from electrically insulating material (i.e., polymers, elastomers, or the like). The first end of the wire connector 12 is configured to receive male slip-on or banana connectors or exposed wires or cables within its interior. In some embodiments, the wire connector 12 may be crimped when receiving exposed wires or cables. More broadly, the wire connector 12 may include nearly any type of electrical connector, such as spade connectors, ring connectors, alligator clip connectors, snap connectors, locking connectors, or the like, and may be male or female.

Figure 11:
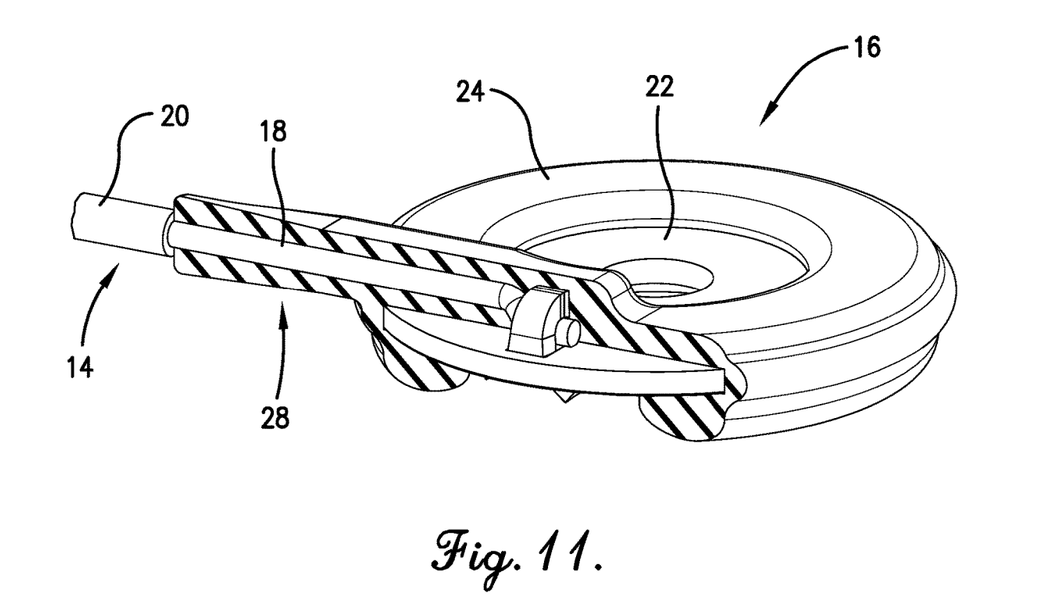
FIG. 11 is a perspective sectional view of the cable and the surface connector illustrating the electrical connection between the cable and the surface connector.

The cable 14 includes a core 18 formed from electrically conductive material which may be single strand wire or multi strand wire and a sleeve 20 formed from electrically insulating material, as best shown in FIG. 11. The cable 14 includes a first end and an opposing second, with the first end being electrically connected to the second end of the wire connector 12. The cable 14 may have a variable length.

The surface connector 16 includes a conductive disc 22, an outer insulating ring 24, an inner insulating ring 26, a cable coupler 28, and a washer 30. The conductive disc 22 is formed from electrically conductive material and has a low profile annular shape with an upper surface, an opposing lower surface, a circumferential outer edge, and a spaced apart circumferential inner edge defining a first central opening. An exemplary conductive disc 22 is formed from stainless steel.

The outer insulating ring 24 is formed from electrically insulating material and includes an upper section that is positioned on and covers a portion of the upper surface of the conductive disc 22, an outer section that is connected to the upper section and covers the outer edge of the conductive disc 22, and a lower section that is connected to the outer section, is positioned on, and covers a portion of the lower surface of the conductive disc 22.

The inner insulating ring 26 is formed from electrically insulating material and has a generally annular shape with an upper surface that is roughly planar. The inner insulating ring 26 has a circumferential outer edge, and a spaced apart circumferential inner edge defining a second central opening which has roughly the same diameter as the first central opening. The inner insulating ring 26 is positioned beneath, and adhered to, the conductive disc 22 such that the upper surface of the inner insulating ring 26 is in contact with the lower surface of the conductive disc 22 and the second central opening is aligned, and concentric, with the first central opening.

The cable coupler 28 couples the surface connector 16 to the cable 14, as shown in FIG. 11. The cable coupler 28 is formed from electrically insulating material and has a generally hollow tubular shape with a first end and an opposing second end. The first end is connected to the sleeve 20 of the cable 14, and the second end is connected to the outer insulating ring 24. The cable coupler 28 also retains the core 18 of the cable 14 within its interior such that the core 18 is electrically connected to the conductive disc 22 either directly or indirectly through an optional conductive tab attached to the conductive disc 22.

The washer 30 is formed from electrically insulating material and includes a washer body 32 and a plurality of teeth 34. An exemplary washer 30 is formed from zincplated steel. The washer body 32 has a low profile annular shape with an upper surface, an opposing lower surface, a circumferential outer edge, and a spaced apart circumferential inner edge defining a third central opening. The teeth 34 are spaced apart from one another and include an inner edge attached to the outer edge of the washer body 32. Each tooth 34 is shaped to have an outer edge with a non-planar portion that contacts surfaces both above the washer 30 and below the washer 30. An exemplary tooth 34 has a rectangular or square shaped with a planar twist such that the inner edge of the tooth 34 is oriented along a first axis and the outer edge is oriented along a second axis which is rotated with respect to the first axis. The non-planar portion extends both upward and downward or surface normal in opposing directions. The washer 30 is positioned underneath the conductive disc 22 such that the inner edge of the washer body 32 contacts the outer edge of the inner insulating ring 26 and the non-planar portion of each tooth 34 contacts the lower surface of the conductive disc 22.

Figure 1:
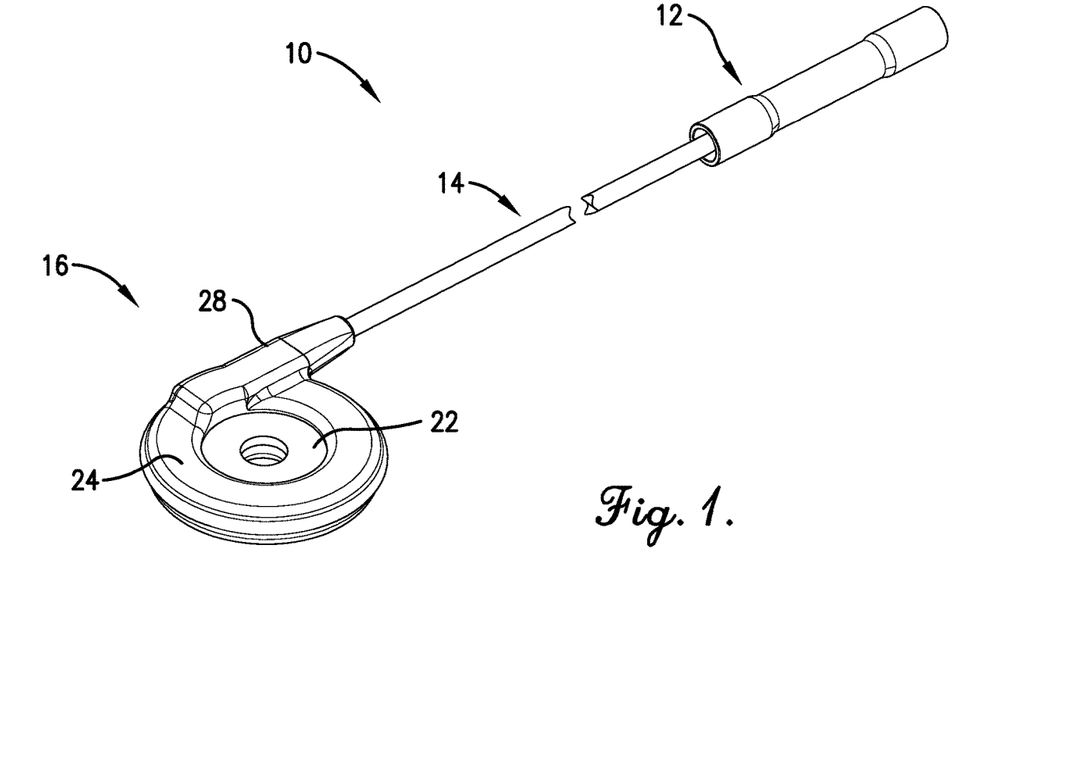
FIG. 1 is a top perspective view of a connector assembly for connection to a vehicle electrical ground, the connector assembly constructed in accordance with various embodiments of the current invention and including a wire connector, a cable, and a surface connector.
Figure 2:
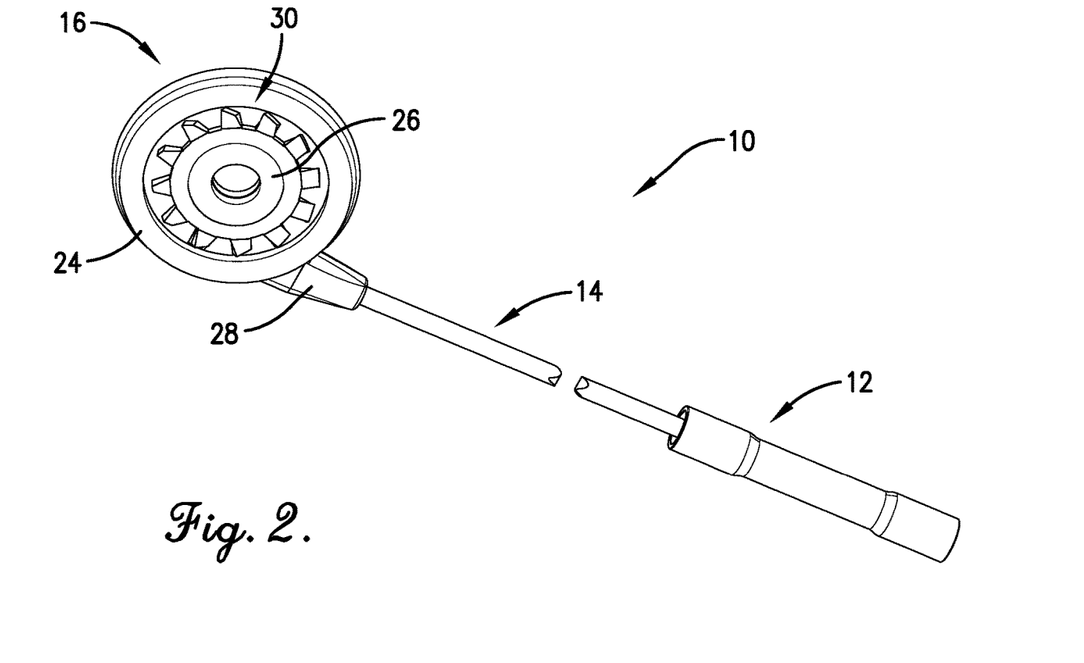
FIG. 2 is a bottom perspective view of the connector assembly.
Figure 3:
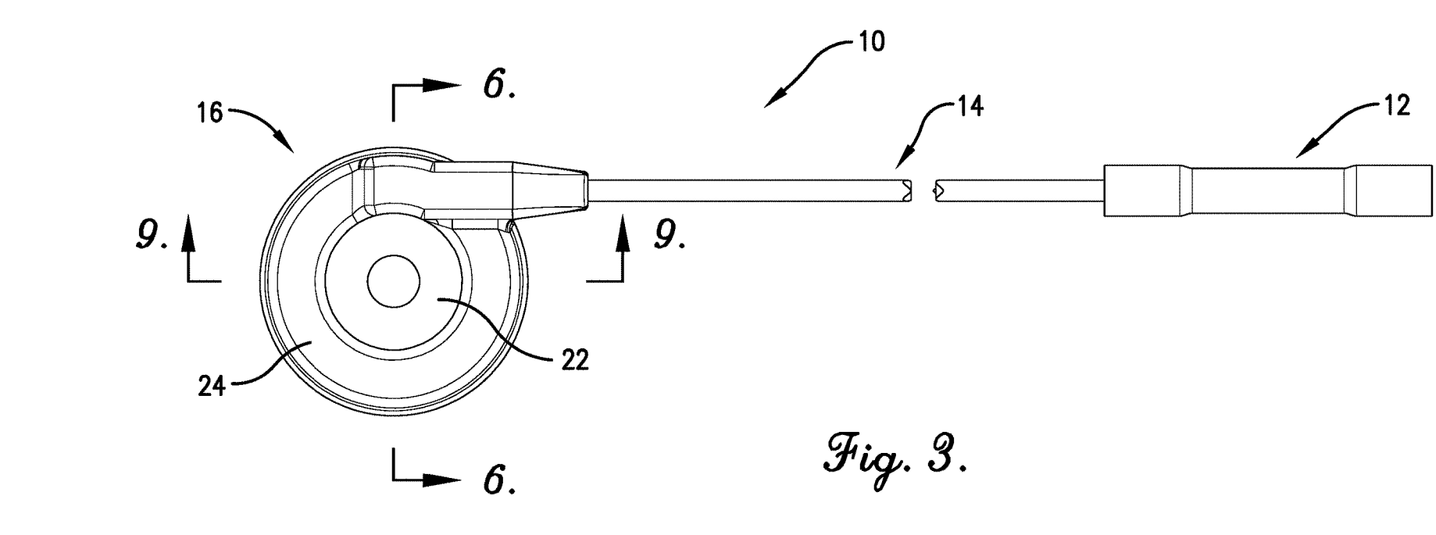
FIG. 3 is a top view of the connector assembly.
Figure 4:
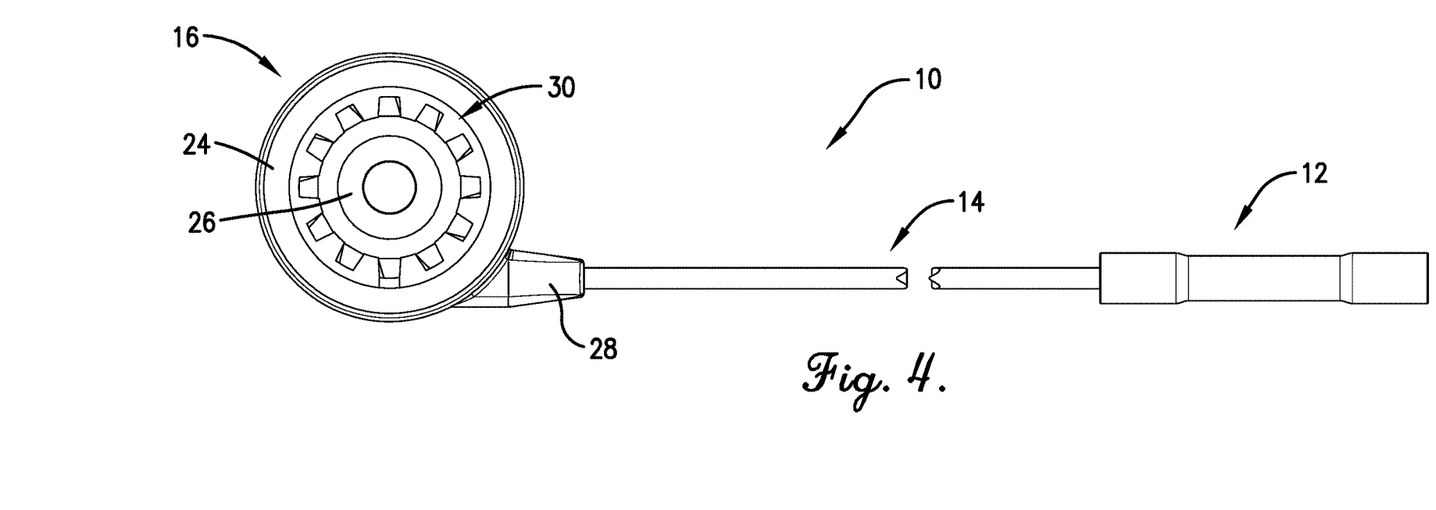
FIG. 4 is a bottom view of the connector assembly.
Figure 5:
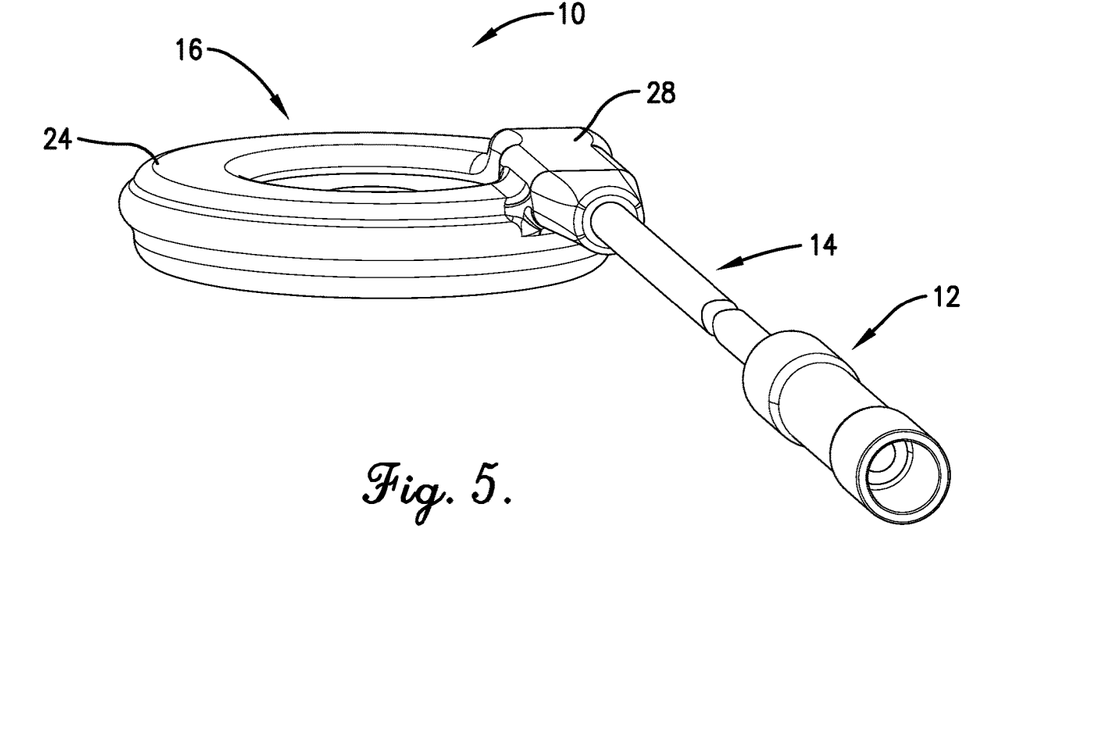
FIG. 5 is a rear perspective view of the connector assembly.
Figure 6:
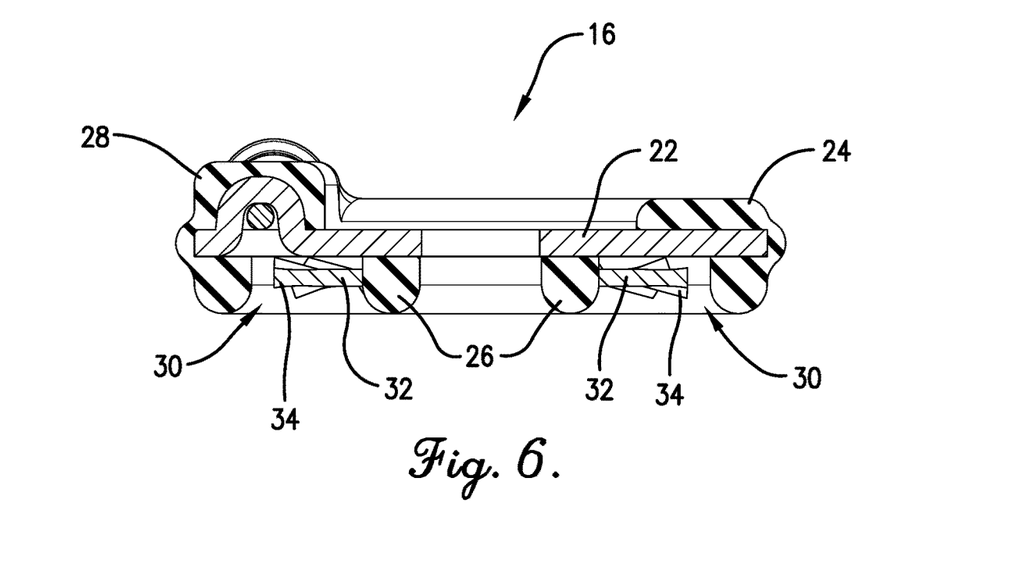
FIG. 6 is a front sectional view of the surface connector and the cable cut along the line 6-6 of FIG. 3.
Figure 7:
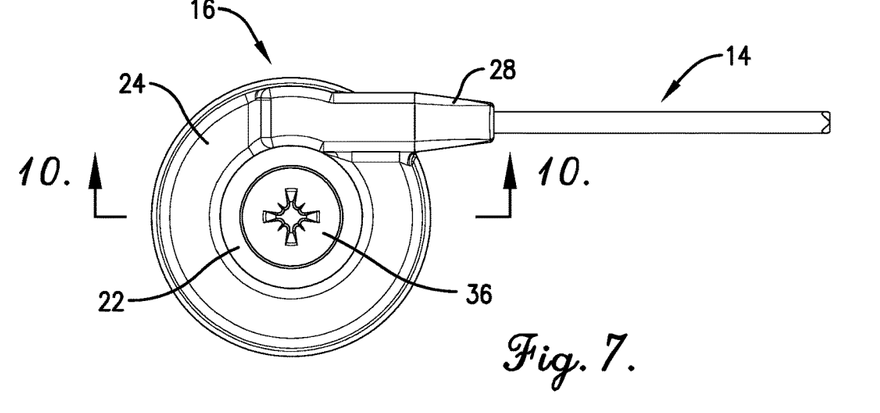
FIG. 7 is an enlarged top view of the surface connector and the cable, with the surface connector retaining a fastener configured to attach the connector assembly to a vehicle chassis.
Figure 8:
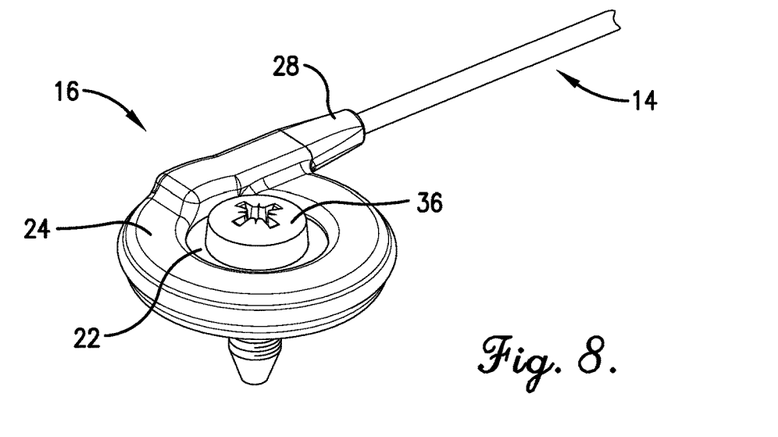
FIG. 8 is an enlarged top perspective view of the surface connector, the cable, and the fastener.
Figure 9:
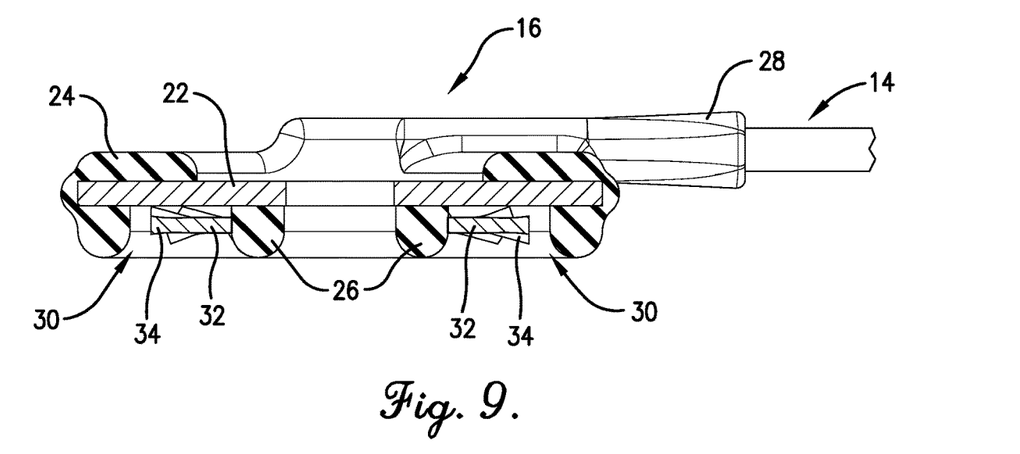
FIG. 9 is a side sectional view of the surface connector and the cable cut along the line 9-9 of FIG. 3.
Figure 10:
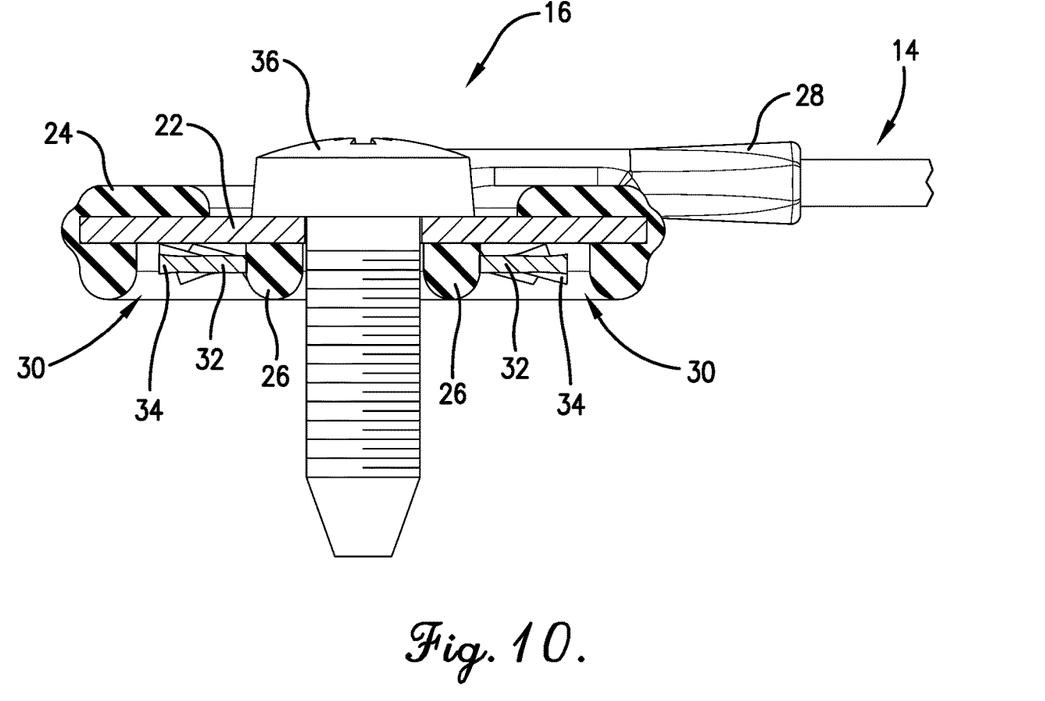
FIG. 10 is a side sectional view of the surface connector, the cable, and the fastener cut along the line 10-10 of FIG. 7.

In some embodiments, the connector assembly 10 may be utilized as follows. The surface connector 16 is aligned with a location on the vehicle chassis configured to provide an electrical connection to electrical ground. Typically, the location includes an opening or hole configured to receive a fastener 36. The fastener 36, such as an electrically conductive screw or bolt, is inserted through the first opening of the conductive disc 22 as shown in FIGS. 7, 8, and 10. The surface connector 16 is positioned on the chassis such that a lower surface of the outer insulating ring 24 and a lower surface of the inner insulating ring 26 contact the surface of the chassis. The fastener 36 is either pushed through the chassis opening, in the case of a bolt, or screwed into the chassis opening, in the case of a screw. As the fastener 36 is tightened to the chassis, the outer insulating ring 24 and the inner insulating ring 26 compress and the teeth 34 of the washer 30 contact the surface of the chassis and the lower surface of the conductive disc 22. The non-planar portion of the outer edge of each tooth 34 contacts the surface of the chassis and the lower surface of the conductive disc 22 with a surface-normal force that fixes the washer 30 in place and prevents rotational slippage of the washer 30 and the conductive disc 22 with respect to the chassis. Furthermore, the outer insulating ring 24 and the inner insulating ring 26 form a hermetically-sealed chamber bounded by surfaces of the conductive disc 22, the outer insulating ring 24, the inner insulating ring 26, and the surface of the chassis. The washer 30 is positioned within the chamber. In various embodiments, terminal grease is positioned in, or applied to, the teeth 34 of the washer 30 and the space adjacent to the conductive disc 22 and the outer insulating ring 24 such that when the hermetically-sealed chamber is formed, the terminal grease displaces oxygen and further prevents the ingress of moisture and salt. When the fastener 36 is sufficiently tightened, the surface connector 16 is attached, connected, or coupled to the chassis.

In other embodiments, the connector assembly 10 may be utilized as follows. The surface connector 16 is aligned with a location on a wall of an enclosure for electric power distribution. In some cases, a hole may need to be drilled or a punch out may need to be removed for positioning of the fastener 36. The surface connector 16 is positioned on the enclosure wall such that a lower surface of the outer insulating ring 24 and a lower surface of the inner insulating ring 26 contact the surface of the enclosure wall. The fastener 36 is either pushed through the enclosure wall opening, in the case of a bolt, or screwed into the enclosure wall opening, in the case of a screw. As the fastener 36 is tightened to the enclosure wall, the outer insulating ring 24 and the inner insulating ring 26 compress and the teeth 34 of the washer 30 contact the surface of the enclosure wall and the lower surface of the conductive disc 22. The non-planar portion of the outer edge of each tooth 34 contacts the surface of the enclosure wall and the lower surface of the conductive disc 22 with a surface-normal force that fixes the washer 30 in place and prevents rotational slippage of the washer 30 and the conductive disc 22 with respect to the enclosure wall. Furthermore, the outer insulating ring 24 and the inner insulating ring 26 form a hermetically-sealed chamber bounded by surfaces of the conductive disc 22, the outer insulating ring 24, the inner insulating ring 26, and the surface of the enclosure wall. The washer 30 is positioned within the chamber. In various embodiments, terminal grease is positioned in, or applied to, the teeth 34 of the washer 30 and the space adjacent to the conductive disc 22 and the outer insulating ring 24 such that when the hermetically-sealed chamber is formed, the terminal grease displaces oxygen and further prevents the ingress of moisture and salt. When the fastener 36 is sufficiently tightened, the surface connector 16 is attached, connected, or coupled to the enclosure wall.

Either before or after the surface connector 16 is attached to the chassis or enclosure wall, an external wire connected to electrical ground of electrical devices or components is electrically connected to the wire connector 12. The external wire may include exposed conductors or a standard connector. Either configuration may be inserted into the wire connector 12. The electrically conductive path from the external wire to the vehicle chassis includes the wire connector 12, the core 18 of the cable 14, the optional conductive tab, the conductive disc 22, and the washer 30.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A connector assembly for providing electrical connection from an electrical device ground wire to a vehicle chassis ground, the connector assembly comprising:
   a wire connector configured to receive the electrical device ground wire;
   a cable electrically connected to the ground wire; and
   a surface connector coupled to the cable and configured to attach to a vehicle chassis, the surface connector including:
      a conductive disc electrically connected to the cable, the conductive disc including an upper surface, an opposing lower surface, a circumferential outer edge, and a spaced apart circumferential inner edge defining a central opening configured to receive a fastener which attaches the surface connector to the chassis,
      an outer insulating ring covering a portion of the upper surface, the outer edge, and a portion of the lower surface of the conductive disc, and
      an inner insulating ring positioned in contact with the lower surface of the conductive disc, the inner insulating ring including an inner edge aligned with the inner edge of the conductive disc,
      wherein the inner insulating ring, a portion of the lower surface of the conductive disc, and the outer insulating ring form a hermetically sealed chamber with the chassis when the surface connector is attached to the chassis.

2. The connector assembly of claim 1, wherein the surface connector further includes a washer formed from electrically conductive material and positioned adjacent to the lower surface of the conductive disc and between the inner insulating ring and the outer insulating ring, the washer providing an electrical connection between the conductive disc and the chassis when the surface connector is attached to the chassis.

3. The connector assembly of claim 2, wherein the surface connector further includes a plurality of teeth spaced apart and positioned along an outer edge of the washer, each tooth including a non-planar portion that extends both upward and downward.

4. The connector assembly of claim 1, wherein the inner insulating ring and the outer insulating ring are each formed from elastomeric material that compresses when the surface connector is attached to the chassis.

5. A connector assembly for providing electrical connection from an electrical device ground wire to a vehicle chassis ground, the connector assembly comprising:
   a wire connector configured to receive the electrical device ground wire;
   a cable electrically connected to the ground wire; and
   a surface connector coupled to the cable and configured to attach to a vehicle chassis, the surface connector including:
      a conductive disc electrically connected to the cable, the conductive disc including an upper surface, an opposing lower surface, a circumferential outer edge, and a spaced apart circumferential inner edge defining a central opening configured to receive a fastener which attaches the surface connector to the chassis,
      an outer insulating ring formed from elastomeric material and covering a portion of the upper surface, the outer edge, and a portion of the lower surface of the conductive disc,
      an inner insulating ring formed from elastomeric material and positioned in contact with the lower surface of the conductive disc, the inner insulating ring including an inner edge aligned with the inner edge of the conductive disc, and
      a washer formed from electrically conductive material and positioned adjacent to the lower surface of the conductive disc and between the inner insulating ring and the outer insulating ring, the washer providing an electrical connection between the conductive disc and the chassis when the surface connector is attached to the chassis,
      wherein the inner insulating ring and the outer insulating ring each compress when the surface connector is attached to the chassis and the inner insulating ring, a portion of the lower surface of the conductive disc, and the outer insulating ring form a hermetically sealed chamber with the chassis.

6. A connector assembly for providing electrical connection from an electrical device ground wire to an electric power distribution enclosure, the connector assembly comprising:
   a wire connector configured to receive the electrical device ground wire;
   a cable electrically connected to the ground wire; and
   a surface connector coupled to the cable and configured to attach to a wall of the electric power distribution enclosure, the surface connector including:
      a conductive disc electrically connected to the cable, the conductive disc including an upper surface, an opposing lower surface, a circumferential outer edge, and a spaced apart circumferential inner edge defining a central opening configured to receive a fastener which attaches the surface connector to the wall,
      an outer insulating ring covering a portion of the upper surface, the outer edge, and a portion of the lower surface of the conductive disc, and
      an inner insulating ring positioned in contact with the lower surface of the conductive disc, the inner insulating ring including an inner edge aligned with the inner edge of the conductive disc,
wherein the inner insulating ring, a portion of the lower surface of the conductive disc, and the outer insulating ring form a hermetically sealed chamber with the wall when the surface connector is attached to the electric power distribution enclosure.

7. The connector assembly of claim 6, wherein the surface connector further includes a washer formed from electrically conductive material and positioned adjacent to the lower surface of the conductive disc and between the inner insulating ring and the outer insulating ring, the washer providing an electrical connection between the conductive disc and the wall when the surface connector is attached to the electric power distribution enclosure.

8. The connector assembly of claim 7, wherein the surface connector further includes a plurality of teeth spaced apart and positioned along an outer edge of the washer, each tooth including a non-planar portion that extends both upward and downward.

9. The connector assembly of claim 6, wherein the inner insulating ring and the outer insulating ring are each formed from elastomeric material that compresses when the surface connector is attached to the electric power distribution enclosure.

* * * * *